(12) United States Patent
Zhao

(10) Patent No.: US 12,291,611 B2
(45) Date of Patent: *May 6, 2025

(54) SOLID-STATE METHOD FOR TREATING POLYAMIDE AND POLYESTER ARTICLES

(71) Applicant: Green Theme Technologies Inc., Rio Rancho, NM (US)

(72) Inventor: Xia Zhao, Malvern, PA (US)

(73) Assignee: GREEN THEME TECHNOLOGIES, INC., Rio Rancho, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/468,485

(22) Filed: Sep. 15, 2023

(65) Prior Publication Data

US 2024/0002610 A1 Jan. 4, 2024

Related U.S. Application Data

(63) Continuation of application No. 17/583,945, filed on Jan. 25, 2022, now Pat. No. 11,760,847.

(51) Int. Cl.
| | |
|---|---|
| C08J 3/24 | (2006.01) |
| C08J 7/04 | (2020.01) |
| D06M 13/364 | (2006.01) |
| D06M 13/53 | (2006.01) |
| D06M 15/643 | (2006.01) |
| D06M 15/71 | (2006.01) |

(52) U.S. Cl.
CPC ............. *C08J 3/245* (2013.01); *C08J 7/0427* (2020.01); *D06M 13/364* (2013.01); *D06M 13/53* (2013.01); *D06M 15/643* (2013.01); *D06M 15/71* (2013.01); *C08J 2377/06* (2013.01); *C08J 2483/07* (2013.01)

(58) Field of Classification Search
None
See application file for complete search history.

(56) References Cited

U.S. PATENT DOCUMENTS

| | | | | |
|---|---|---|---|---|
| 2,615,781 A | * | 10/1952 | Olpin et al. | D06P 1/6424 |
| | | | | 8/929 |
| 3,024,220 A | * | 3/1962 | Cramer | C08G 63/78 |
| | | | | 528/308.5 |
| 4,764,427 A | * | 8/1988 | Hara | D01F 11/14 |
| | | | | 428/397 |
| 5,126,389 A | | 6/1992 | Ona et al. | |
| 5,998,551 A | | 12/1999 | O'Neil | |
| 6,399,714 B1 | | 6/2002 | Huang | |
| 11,760,847 B2 | * | 9/2023 | Zhao | D06M 15/71 |
| | | | | 427/394 |
| 2012/0129962 A1 | * | 5/2012 | Ellsworth | C08L 69/00 |
| | | | | 524/517 |
| 2017/0029663 A1 | * | 2/2017 | Selwyn | D06B 5/22 |

FOREIGN PATENT DOCUMENTS

WO 2019/152264 A 8/2019

OTHER PUBLICATIONS

Yang et al.; in Polymer Testing 27 (2008) 957-963.
Pramanik et al., Radiation Physics and Chemistry 79 (2009) 199-205.

* cited by examiner

*Primary Examiner* — Alexander M Weddle
(74) *Attorney, Agent, or Firm* — Maschoff Brennan

(57) ABSTRACT

Solid-state branching and/or crosslinking of aliphatic polyamide or polyester articles is achieved using a topical approach. A surface of the article is coated with a composition that includes a polyene and a free radical initiator. The article and applied coating are then heated to induce branching and/or crosslinking in the polyamide or polyester. This is performed below the crystalline melting temperature of the polyamide or polyester, or in the case of a fabric, below the melting temperature of the fibers in the fabric. Fabrics treated in this manner exhibit reduced or even no dripping in vertical flame tests.

20 Claims, No Drawings

SOLID-STATE METHOD FOR TREATING POLYAMIDE AND POLYESTER ARTICLES

The present invention relates generally to a method for treating polyamide and/or polyester articles.

Thermoplastic aliphatic polyamides (commonly known as "nylon") and polyesters are used, among other purposes, for producing fibers and yarns that are subsequently knitted or woven to produce fabrics. Polyamide fabrics are notable for their high strength and abrasion resistance. Polyamide and polyester fabrics are useful in making clothing, and protective gear for military, paramilitary and law enforcement personnel. These fabrics are also used to make various products for use inside home, office and/or other buildings; these include carpets, drapes and curtains, furniture upholstery, bedding, shower curtains, window treatments, wall coverings and other decorative coverings, among others.

Being a thermoplastic material, polyamide and polyester can and will heat soften and flow if heated to a high enough temperature. In at least some of the foregoing applications, it is important that the article resists dripping when exposed to an open flame or other source of heat. This is often a matter of fire safety; a dripping, burning material can spread flames and can drip onto people or animals, causing injury or death. This concern is reflected in various standard burn tests, such as ASTM D6413-11, the EN 13501-1 Single Burning Item test and the British Standard BS5867 Part 2-Type B test, which evaluate for droplet formation under specified ignition conditions.

Many strategies have been devised for improving performance of nylon and polyester articles on standardized fire tests. These often include the inclusion of various additives such as char formers, organophosphorus compounds, organohalogen compounds, hydrated minerals, red phosphorus and borates. All of these have drawbacks. They increase costs; require additional processing steps; affect physical and/or aesthetic properties. In some cases they pose exposure or environmental risks. Most have little effect on melting and/or dripping.

Molded nylon parts can be crosslinked by compounding thermoplastic nylon with a polyene compound such as triallyl cyanurate, triallyl isocyanurate, and trimethylolpropane trimethacrylate, and then irradiating the compounded material in a mold. See, e.g., Pramanik et al., *Radiation Physics and Chemistry* 79 (2009) 199-205. Although in principle melting and/or dripping can be reduced by crosslinking nylon or polyester, this process is not amenable to the production of fibers or fabric at an industrial scale. Similarly, polymers have been crosslinked or branched using a combination of such a polyene compound and various free radical initiators. This is described, for example, in WO 2019/152264 and by Yang et al. in *Polymer Testing* 27 (2008) 957-963. These methods are performed in the melt. They are not amenable to industrial fiber or yarn production because significant amounts of gels are produced. These gels clog spinnerets and cause fiber breakage during spinning and/or subsequent drawing steps.

This invention is a solid-state method for treating a polyamide and/or polyester article which comprises a polyamide and/or polyester component, in which the polyamide and/or polyester component comprises at least one thermoplastic aliphatic polyamide or thermoplastic polyester resin having a crystalline melting temperature of at least 100° C. The method comprises;
  a) at a temperature below the crystalline temperature of the polyamide and/or polyester resin, applying a coating composition to at least one surface of the article and into contact with at least one polyamide and/or polyester component of the article, wherein the coating composition comprises i) at least one polyene compound, the polyene compound having 2 to 6 vinyl groups, an equivalent weight per vinyl group of up to 500 g/equivalent, and (ii) at least one free radical initiator; and
  b) heating the coated article to a temperature of at least 70° C. but below the crystalline melting temperature of the polyamide and/or polyester resin to decompose the peroxy or azo free radical initiator to form free radicals and produce crosslinking in the aliphatic polyamide and/or polyester resin.

Very surprisingly, the applicant has found that crosslinking can be produced in aliphatic polyamide resins and polyester resins via the topical application of a coating composition followed by a solid state (i.e., below the crystalline melting temperature of the thermoplastic resin) heating step. The ability to crosslink in this manner provides very substantial advantages. It becomes unnecessary to melt-blend the crosslinking agents (polyene and free radical initiator) into the thermoplastic resin before producing the article. Thus, special grades of resins are need needed and the compounding costs to produce them are avoided. Radiation treatment steps such as described in Pramanik et al., *Radiation Physics and Chemistry* 79 (2009) 199-205 become unnecessary and therefore can be eliminated. Simple and inexpensive coating and heating equipment can be used. The process is adaptable to both continuous and batch operations, and so often can be performed on existing production lines.

This process, in effect, allows polyamide and/or polyester articles produced using melt-processing methods such as melt spinning, extrusion, blow molding, etc., to be modified in a simple way to produce in them (or at least at the treated surface) properties more akin to those of crosslinked thermoset polymers that otherwise could not be used in melt processing operations. One particular advantage is that the treated product generally exhibits a reduction or even elimination of melting and/or dripping when exposed to a flame in a vertical flame test. This is an important benefit when the article is a fabric or sheet material that constitutes or forms a part of personal wear, protective gear, and building, furnishing or decorative products.

The process of the invention typically does not affect the dimensions or geometry of the article, changes in size and shape as a result of the process being negligible or even non-existent.

The process is especially suitable for treating polyamide and/or polyester fabrics. Therefore, in a second aspect, the invention is a solid-state method for treating an polyamide and/or polyester fabric which fabric comprises polyamide and/or polyester fibers alone or a blend of aliphatic polyamine and/or polyester resin fibers with fibers of at least one other polymer that is not an aliphatic polyamide and/or polyester resin, the fibers having a melting temperature of at least 100° C. as measured according to ASTM D7138-16, the method comprising;
  a) at a temperature below the melting temperature of the fibers, applying a coating composition to at least one surface of the fabric, wherein the coating composition comprises i) at least one polyene compound, the polyene compound having 2 to 6 vinyl groups, an equivalent weight per vinyl group of up to 500 g/equivalent, and (ii) at least one free radical initiator; and
  b) heating the coated fabric to a temperature of at least 70° C. but below the melting temperature of the fibers to decompose the peroxy or azo free radical initiator to form free radicals and produce crosslinking in the aliphatic polyamide and/or polyester resin.

In a third aspect, the invention is a solid-state method for reducing melting and/or dripping of an aliphatic polyamide and/or polyester fabric which fabric comprises polyamide and/or polyester resin fibers alone or a blend of aliphatic polyamine and/or polyester resin fibers with fibers of at least one other polymer that is not an aliphatic polyamide and/or polyester resin, the fibers having a melting temperature of at least 100° C. as measured according to ASTM D7138-16, the method comprising;
  a) at a temperature below the melting temperature of the fibers, applying a coating composition to at least one surface of the fabric, wherein the coating composition comprises i) at least one polyene compound, the polyene compound having 2 to 6 vinyl groups, an equivalent weight per vinyl group of up to 500 g/equivalent, and (ii) at least one free radical initiator; and
  b) heating the coated fabric to a temperature of at least 70° C. but below the melting temperature of the fibers for a period of 1 minute to 2 hours.

The fabric remains flexible and pliable after treatment; notably, the fibers or filaments do not agglomerate to form large masses. Little or no change in tactile properties (sometimes expressed as "hand") are seen. Air flows are substantially unchanged or unchanged only slightly.

A further advantage of the invention is that the coating composition may further include additional components that provide beneficial effects. These may include, for example, plasticizers, fabric softeners, dyes, hydrophobic and/or oleophobic treatments, as well as many others.

The article includes at least one polyamide and/or polyester component. The polyamide and/or polyester component contains at least one aliphatic polyamide resin and/or at least one polyester resin. In some embodiments, the aliphatic polyamide and/or polyester resin constitutes at least 50%, at least 75% or at least 90% of the total weight of the polyamide and/or polyester component.

The polyamide is aliphatic, i.e., lacks aromatic groups. It is a thermoplastic organic polymer having repeating units that are connected by amide linkages. The formula molecular weight per amide group is preferably at most 500 g/mol and preferably at most 300 g/mol. The polyamide has crystalline melting temperature of at least 100° C., preferably at least 150° C. as measured according to the capillary tube method of ISO 3146:2000. The polyamide may be a polymer of an α,ω-amino acid, a copolymer of a dicarboxylic acid and a diamine, a polymer of a cyclic lactam, or a combination of any two or more thereof. Examples of useful polyamides include nylon 4, nylon 6, nylon 8, nylon 9, nylon 10, nylon 12, nylon 4/6, nylon 5/6, nylon 6/6, nylon 6/9, nylon 10/10 and nylon 10/12.

The polyester may or may not contain aromatic groups. It is a thermoplastic polymer having repeating units connected by ester linkages. The formula molecular weight per ester group is preferably at most 500 g/mol and preferably at most 300 g/mol. The polyester has crystalline melting temperature of at least 100° C., preferably at least 150° C. as measured according to the capillary tube method of ISO 3146:2000. The polyester may be, for example and without limitation, a poly(ethylene terephthalate), a poly(butylene terephthalate), a poly(ethylene adipate-co-terephthalate), a poly(butylene adipate-co-terephthalate), a poly(ethylene succinate), a poly(1,4-cyclohexylene-dimethylene terephthalate or a poly(butylene succinate).

The polyamine and/or polyester component may contain other materials in addition to the aliphatic polyamide and/or polyester. These may include, for example and without limitation, other polymers that are blended in or form a dispersion with the aliphatic polyamide and/or polyester resin; fillers and reinforcing agents; rheology modifiers; impact modifiers; plasticizers; colorants; various thermoplastic processing aids such as lubricants; preservatives; biocides; antioxidants and UV stabilizers, among many others.

The article may comprise one or more components that do not contain an aliphatic polyamide and/or polyester resin. Such other components may be, for example, affixed to the polyamide and/or polyester component adhesively, mechanically, magnetically or otherwise. For example, the article may be a multilayer structure having one or more polyamide and/or polyester layers and one or more other layers that do not contain any aliphatic polyamide or polyester resin.

Articles of particular interest include fabrics that have aliphatic polyamide and/or polyester fibers. Such fabrics contain aliphatic polyamide and/or polyester fibers and/or yarns that are woven, knitted, entangled, knotted, felted, melt-bonded or glued together. The aliphatic polyamide and/or polyester fibers or yarns may be blended with other fibers or yarns of other material such as cotton, polyurethane (including spandex), cellulose, wool, acetates, silk, aramid, polypropylene, polyacetate, cellulose ester (such as rayon) and the like. The fibers have a melting temperature of at least 100° C., preferably at least 150° C. according to ASTM D7138-16 Method A (if a blend of two or more different fibers) or Method B (if single component fibers). The fabric may be in the form of roll goods that may have widths of 100 mm or more, such as 300 mm up to 7 meters or more, and/or may constitute all or a portion of a finished article such as an article of clothing, drapery, bedding, carpeting, wall coverings and the like.

In step a) of the process, a coating composition to at least one surface of the article and into contact with at least one polyamide and/or polyester component of the article. The coating composition comprises i) at least one polyene compound, the polyene compound having 2 to 6 vinyl groups, an equivalent weight per vinyl group of up to 500 g/equivalent, and (ii) at least one free radical initiator. The coating composition advantageously is in the form of a liquid or of a dispersion having a liquid phase containing dispersed solids at the temperature at which it is applied to the article. If a dispersion, the polyene compound(s) and free radical initiator each may independently reside in the liquid or the solid phase, or partially in both. The liquid phase of a dispersion may be, for example, the polyene compound(s) or free radical initiator, or both; alternatively or in addition, the liquid phase may be or include a carrier or other functional component. In some embodiments, the coating composition is a dispersion of solid free radical initiator particles in a liquid phase that includes liquid polyene compound(s) and optionally one or more other liquid components such as a carrier and/or other liquid functional component.

The polyene compound(s) contain 2 to 6 vinyl group per molecule. A "vinyl" group for purposes of this invention is a —CHR=CHR group, where each R is independently hydrogen, linear, branched or cyclic alkyl having up to 6 carbon atoms, or phenyl. The vinyl groups preferably are allylic, i.e., part of a larger group having the form —CH$_2$—CHR=CHR, and/or are enones i.e., part of a larger group having the form —C(O)—CHR=CHR. R is preferably hydrogen in each case.

In some embodiments, the polyene compound(s) each (if more than one) contains 2 to 4 vinyl groups per molecule and in particular embodiments contains 2 or 3 vinyl groups per molecule.

Each polyene compound may have an equivalent weight per vinyl group of up to 500. This equivalent weight may be at least 50, at least 70 or at least 90 and up to 400, up to 300 or up to 250 g/equivalent.

Examples of suitable polyene compounds include, for example, various compounds corresponding to esters of acrylic acid or methacrylic acid and a polyol. These include, for example, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, cyclohexane dimethanol diacrylate, alkoxylated hexanediol diacrylate, neopentyl glycol diacrylate, propoxylated neopentyl glycol diacrylate, trimethylolpropane triacrylate, ethoxylated trimethylolpropane triacrylate, propoxylate d trimethylolpropane triacrylate, glycerine triacrylate, ethyloxylated and/or propoxylated glycerine triacrylate, pentaerythritol di-, tri- or tetraacrylate, erythritol di-, tri- or tetraacrylate, acrylated polyester oligomer, bisphenol A diacrylate, acrylated bisphenol A diglycidylether, ethoxylated bisphenol A diacrylate, and the like, as well as the corresponding compounds in which the acrylate groups are replaced with methacrylate groups. Other suitable acrylate compounds include tris(2-hydroxyethyl)isocyanurate triacrylate and acrylated urethane oligomers.

Other suitable polyene compounds are compounds having two or more allylic groups. Examples of these include polyallyl ethers of a polyol and polyallyl esters of a polycarboxylic acid.

Suitable polyallyl ethers include, for example, 1,4-butane diol diallyl ether, 1,5-pentanediol diallyl ether, 1,6-hexanediol diallyl ether, neopentyl glycol diallyl ether, diethylene glycol diallyl ether, triethylene glycol diallyl ether, tetraethylene glycol diallyl ether, polyethylene glycol diallyl ether, dipropylene glycol diallyl ether, tripropylene glycol diallyl ether, cyclohexane dimethanol diallyl ether, alkoxylated hexanediol diallyl ether, neopentyl glycol diallyl ether, propoxylated neopentyl glycol diallyl ether, trimethylolpropane di- or triallyl ether, ethoxylated trimethylolpropane di- or triallyl ether, propoxylated trimethylolpropane di- or triallyl ether, glycerine di- or triallyl ether, ethyloxylated and/or propoxylated glycerine di- or triallyl ether, pentaerythritol di-, tri- or tetraallyl ether, erythritol di-, tri- or tetraallyl ether, acrylated polyester oligomer, bisphenol A diacrylate, acrylated bisphenol A diglycidylether, ethoxylated bisphenol A diallyl ether, and the like.

Examples of suitable polyallyl esters include diallyl maleate, diallyl fumarate, diallyl phthalate, diallyl terephthalate, diallyl succinate, di- or triallyl citrate and the like.

Other useful polyene compounds include triallyl cyanurate and triallyl isocyanurate (TAIC).

The free radical initiator is one or more compounds that thermally react and/or decompose under the conditions of step b) of the process to produce free radicals. Free radical initiators that are solids at 22° C. are preferred, as are those having a 10 hour half-life temperature (as reported by their manufacturer) of at least 30 to 70° C. as measured in toluene and a 10 minute half-life temperature of especially 80 to 120° C. The free radical initiator preferably is soluble in water to the extent of no more than 1 gram per liter of water, and soluble in toluene to the extent of at least 25 grams per liter of toluene.

Azo free radical initiators have been found to be especially useful. Azo free radical initiators include an R—N=N—R' moiety, where R and R' are organic groups that form a carbon-nitrogen bond to the respective adjacent nitrogen. Examples of azo free radical initiators include 2,2'-azobisisobutyronitrile (AIBN), 2,2'-azobis(2,4-dimethylpentanenitrile), 4,4'-azobis(4-cyanovaleric acid), 1,1'-azobis(cyclohexane-1-carbonitrile), 2,2'-azobis(4-methoxy-2,4-dimethylvaleronitrile) and 2,2'-azobis(2-methylbutyronitrile).

Other useful free radical initiators include, for example, 1) acyl peroxides such as acetyl or benzoyl peroxides, 2) alkyl peroxides such as cumyl, dicumyl, lauroyl, or t-butyl peroxides, 3) hydroperoxides such as t-butyl or cumyl hydroperoxides, 4) peresters such t-butyl perbenzoate, 5) other organic peroxides including acyl alkylsulfonyl peroxides, dialkyl peroxydicarbonates, diperoxyketals, or ketone peroxides, 6) cyclic ketones and 1,2,4-trioxepanes as described, for example, in U.S. Pat. No. 8,334,348, 7) azide compounds, 8) various tetrazines and 9) various persulfate compounds such as potassium persulfate.

The polyene compound(s) may constitute, for example, 1 to 99% of the total weight of the coating composition. In specific embodiments, the polyene compound(s) constitute at least 5%, at least 10%, at least 20%, at least 30% or at least 35% of the total weight of the coating composition. In other specific embodiments, the polyene compound(s) constitute up to 95%, up to 80%, up to 60% or up to 50% of the total weight of the coating composition.

The free radical initiator constitute, for example, 0.1 to 50% of the total weight of the coating composition. In specific embodiments, the polyene compound(s) constitute at least 0.5%, at least 1%, at least 2%, at least 3% or at least 4% of the total weight of the coating composition. In other specific embodiments, the polyene compound(s) constitute up to 25%, up to 15%, up to 10%, up to 7.5% or up to 6% of the total weight of the coating composition.

The coating composition may contain other ingredients, which may function as carriers (i.e., to provide or supplement a liquid phase) and/or perform other specific functions.

Useful carriers or mixture of carriers are liquid at 22° C. or else are materials that are solid at 22° C. but—have a melting temperature of 70° C. or less, preferably 50° C. or less. The carrier preferably also has a boiling temperature of at least 100° C., more preferably at least 125° C. and still more preferably at least 150° C. Examples of useful carriers are (i) aliphatic monoalcohols or aliphatic monocarboxylic acids having 14 to 30 carbon atoms; (ii) esters of a fatty acid and a fatty alcohol, the ester having 18 to 48 carbon atoms, preferably 20 to 36 carbon atoms; (iii) a polyether having one or more hydroxyl groups; (iv) a polysiloxane, which can be linear, branched or cyclic, and may be vinyl-terminated; (v) a polysiloxane-poly(alkylene glycol) copolymer; (vi) a wax, such as a polyethylene wax, bees wax, lanolin, carnauba wax, candelilla wax, ouricury wax, sugarcane wax, jojoba wax, epicuticular wax, coconut wax, petroleum wax, paraffin wax and the like; (vii) a fluoropolymer, (viii) solid vegetable and/or animal oils or fats; (viii) another organic oligomer or polymer having a pure phase melting or softening temperature up to 100° C. or (ix) various plasticizers.

Among the aliphatic monoalcohols are fatty alcohols, including saturated fatty alcohols such as 1-dodecanol, 1-tetradecanol, 1-hexadecanol, 1-octadecanol, and the like, as well as fatty alcohols have one or more sites of carbon-carbon unsaturation in the fatty alcohol chain. Among the useful esters of a fatty acid and a fatty alcohol are, for example, hexyl octadecanoate, octyl octadecanoate, dodecyl octadecanoate, hexadodecyl octadecanoate, and the like. The fatty acid and/or fatty alcohol portions of the ester may contain one or more sites of carbon-carbon unsaturation.

Suitable polyethers are polymers of one or more cyclic ethers such as propylene oxide, tetramethylene glycol and the like. The molecular weight is high enough to produce a polymer having a melting temperature up to 100° C. The polyether may contain one or more hydroxyl groups. It may be linear or branched. The polyether may contain terminal alkyl ester groups. Specific examples of suitable polyethers include poly(ethylene oxide), monoalkyl esters of a poly (ethylene oxide), polypropylene oxide), monoalkyl esters of a polypropylene oxide), ethylene oxide-propylene oxide copolymers and monoalkyl esters thereof, poly(tetramethylene oxide) and the like.

Useful polysiloxanes include, for example, poly(dimethyl siloxane) and copolymers thereof. The polysiloxane may be linear, branched or cyclic. Useful siloxane-poly(alkylene glycol) copolymers include, for example, poly(dimethyl siloxane-poly(ethylene glycol) copolymers which can have a block or graft structure. Especially preferred polysiloxanes include octamethylcyclotetrasiloxane, decamethylcyclopentasiloxane, and linear or branched polydimethylsiloxane (PDMS) oil, polymethylhydrosiloxane (PMHS) oil, and other liquid cyclomethicones. The polysiloxane may be vinyl-terminated, having, for example, vinyl contents of 0.1 to 5 mmoles/gram. Such vinyl-terminated polysiloxane products are available from AB Specialty Silicones under the Andisil® trade name; grades having nominal viscosities of 6 to 1000 cSt are particularly useful. Paraffin or beeswax waxes are especially preferred wax carriers. Stearyl and cetyl alcohol are especially preferred alcohol carriers and are solids at 22° C.

Among the plasticizers are phthalate esters, trimellitate esters, adipate esters, maleate esters, benzoate esters, terephthalate esters, various fatty acid esters, epoxidized vegetable oils, sulfonamides, organophosphates, alkyl citrates, acetylated monogylcerides and the like.

The carrier may provide certain functional attributes to the cured composition. In some embodiments, the carrier provides increased hydrophobicity and/or oleophobic properties to the cured composition. It may also perform a plasticizing function.

The carrier may also include low molecular weight organic compounds that have boiling temperatures below 100° C. These low molecular weight organic compounds include, for example, liquid polyethers and polyether mono alkyl esters such as PPG-14 monobutyl ester; liquid alkanes such as n-hexane, n-pentane, n-heptane, henicosane, docosane, tricosane, tetracosane, pentacosane, hexacosane, heptacosane, octacosane, nonacosane, triacontane and the like; liquid alcohols such as n-propanol, isopropanol, n-butanol, t-butanol, methanol and ethanol; fluorinated alkanes such as perfluorohexane, perfluoroheptane, perflurodecanepinane, perfluorodecane-octane, perfluorododecane and the like; chlorinated alkanes and chlorinated aromatic compounds such as isoamyl chloride, isobutyl chloride and benzyl chloride; alkane diols and polyalkylene glycols such as ethylene glycol, propylene glycol, diethylene glycol, triethylene glycol, dipropylene glycol, tripropylene glycol and 1,4-butane diol; liquid esters such as diisopropyl sebacate and glycerol tripalmitate; ketones such as acetone and methyl ethyl ketone; liquid fatty acids such as stearic acid, oleic acid, palmitic acid, lauric acid and the like; 1-naphthalamine; biphenyl; benzophenone; diphenyl amine; 1,2-diphenylethane; maleic anhydride; pyrazine; thymol; glycerin; sorbitol or other sugars; and dibenzylidene sorbitol.

Carriers, if present, may constitute 1 to 98.9% of the total weight of the coating composition. A preferred lower amount is at least 5%, at least 10% or at least 25%; a preferred upper amount is up to 75%, up to 60%, or up to 50%.

Other examples of such other ingredients include one or more free-radical-curable monomers having molecular weights up to 500. Examples of such monomers include having exactly one free radical polymerizable group and at least one hydrocarbyl group that has at least eight carbon atoms and/or at least one siloxane group bonded directly or indirectly to the polymerizable group. The hydrocarbyl groups may be partially fluorinated or perfluorinated. The free-radical polymerizable group can be any that polymerizes in a free-radical polymerization, but preferably is a vinyl, acrylate, methacrylate or chlorosilane group. The component a) monomer(s) preferably have a solubility in water of no greater than 2 parts by weight, more preferably no greater than 1 parts by weight, and still more preferably no more than 0.25 part by weight, per 100 parts by weight of water, at 30° C. Water preferably is soluble in the component a) monomer(s) to the extent of no greater than 2 parts by weight, more preferably no greater than 1 parts by weight and more preferably no greater than 0.25 part by weight, per 100 parts by weight of the monomer(s), at 30° C. Examples of such monomers are described further in WO 2015/127479. Specific examples of component a) monomers include, but are not limited to, one or more of the following: octyl acrylate, octyl methacrylate, decyl acrylate, decyl methacrylate, lauryl acrylate, lauryl methacrylate, octadecyl acrylate, octadecyl methacrylate, 2-(perfluorohexyl)ethyl acrylate, 2-(perfluorooctyl)ethyl acrylate, 2-(perfluorodecyl) ethyl acrylate, 2-(perfluorohexyl)ethyl methacrylate, 2-(perfluorooctyl)ethyl methacrylate, lauryl methacrylate, stearyl methacrylate, 2-(perfluorodecyl)ethyl methacrylate, 2-(perfluorooctyl)ethyl trichlorosilane, vinyl siloxane and vinyl naphthalene. Other monomers include crosslinking monomers having at least two free-radical-curable groups and preferably having a boiling temperature of at least 100° C. The crosslinking monomers may have, for example 2 to 20, preferably 2 to 8 and more preferably 2 to 6 free-radical-curable groups per molecule. Examples of crosslinking monomers include polyacrylate or polymethacrylate compounds having 2 to 20, preferably 2 to 8 or 2 to 6 acrylate and/or methacrylate groups per molecule. Specific examples include acrylate and/or methacrylate esters of polyols having 2 to 50, 2 to 20 or 4 to 12 carbon atoms, such as 1,4-butanediol diacrylate, 1,6-hexanediol diacrylate, 1,8-octanediol diacrylate, cyclohexane dimethanol diacrylate, trimethylolpropane triacrylate, glycerin triacrylate, pentaerythritol tetraacrylate, dipentaerythritol tetraacrylate, diepentaerythritol hexacrylate, the corresponding methacrylates, and the like. So-called drying oils like linseed oil, safflower oil and tung oil are also useful crosslinking monomers.

Monomers, if present at all, may constitute 0.1 to 98.9% of the coating composition. A preferred amount is up to 75%, up to 60% or up to 50%.

The coating composition may further contain one or more blowing agents. Suitable blowing agents include physical (endothermic) types which are liquids at 22° C. but volatilize under the conditions of the curing step, and physical types which decompose or otherwise react under the conditions of the curing reaction to form a gas. If an organic physical blowing agent is present, it should be used in small amounts such that the curable composition contains no more than 10%, preferably no more than 5%, more preferably no more than 2% and still more preferably no more than 1%, even more preferably no more than 0.25% by weight of organic compounds having a boiling temperature of less than 100° C. Chemical blowing agents preferably generate carbon dioxide or nitrogen; these include the so-called azo types, peroxy blowing agents such as peroxyesters, peroxycarbonates and the like, and certain carbamate and citrate compounds.

A preferred coating composition includes 10 to 60% by weight of the polyene compound(s), 2 to 10% by weight of the free radical initiator(s) and 25 to 75% of one or more carriers, all based on the total weight of the coating composition.

In a specific embodiment, the coating composition comprises 10 to 60% of the polyene compound, 2 to 10% by weight of the free radical initiators and 25 to 75% of one or more polysiloxanes. In such embodiments, the polysiloxane may be a mixture of a vinyl-terminated polysiloxane as described above and another polysiloxane that is not vinyl-terminated.

The curable composition can be prepared by simple mixing of the ingredients. The order of addition is generally not important provided the free radical initiator is not exposed to a temperature at which it decomposes. A preferred method of forming the composition is to combine them in any order at a temperature of 10 to 50° C., with agitation.

The coating composition is applied to the article and into contact with at least one polyamide and/or polyester component of the article. It can be applied using any of many convenient methods, such as by rolling, brushing, spraying, immersing the article into the composition, applying a puddle and scraping the composition into the surface of the article using, for example, and air knife or doctor blade, and the like. A particularly useful way of applying it, especially in a continuous industrial process, is to roll it onto the article using a roller. The curing composition in such cases is applied to the roller in any convenient manner and transferred to the substrate by contacting the substrate with the roller.

The application temperature (i.e., the temperature of the article at the time of application) is below the crystalline melting temperature of the polyamide and/or polyester resin or, in the case of a fabric, below the melting temperature of the fibers as measured according to the applicable method of ASTM D-7138-16. It is important that the article remain in a solid state throughout the process. The application temperature preferably no greater than 70° C. and more preferably is no greater than 50° C. or no greater than 35° C. An especially preferred application temperature is 10 to 35° C.

The amount of coating applied can be expressed in terms of the weight of the article and/or in terms of the surface area thereof to which the coating composition is applied.

In some embodiments, the amount of coating composition is sufficient to provide 0.005 to 0.75 kg of polyene compound(s) per kg of polyamide and/or polyester component in the article. The amount of coating composition may be sufficient to provide at least 0.01, at least 0.025, at least 0.05 or at least 0.06 kg of polyene compound per kg of polyamaide and/or polyester component in the article. In some embodiments, the amount of coating composition is selected to provide at most 0.6, at most 0.4 or at most 0.3 kg of polyene compound per kg of polyamide and/or polyester component in the article. The total weight of the coating composition may be, for example, 0.05 to 1 kg, especially 0.1 to 0.75, kg of coating composition per kg of polyamide and/or polyester component in the article.

The coated article is then heated to decompose the peroxyl or azo free radical initiator to form free radicals and produce crosslinking in the aliphatic polyamide and/or polyester resin. The heating step is preferably performed in an oxygen-deficient atmosphere. An oxygen-deficient atmosphere for purposes of this invention is a gas containing at most 1 mole-percent molecular oxygen (O2). The oxygen-deficient atmosphere may contain no more than 0.1 mole percent molecular oxygen. The oxygen-deficient atmosphere may contain at least 98 mole-percent, preferably at least 99 mole percent and more preferably at least 99.9 mole percent, of an inert gas such as nitrogen, argon, carbon dioxide, steam, helium or a mixture of any two or more thereof.

The temperature during this heating step is at least 70° C. but is below the crystalline melting temperature of the polyamide and/or polyester component, or in the case of a fabric, below the fiber melting temperature as determined according to the applicable method of ASTM D7138-16. The article remains in the solid state during the heating step, exhibiting no or negligible changes to its original dimensions and geometry. A preferred temperature is at least 80° C. or at least 90° C., up to 150° C. or up to 125° C.

The heating step preferably is performed in the substantial absence of ionizing radiation, such as no greater than 1 kGy, no greater than 0.1 no greater than 0.01 kGy of ultraviolet radiation, e-beam radiation or other ionizing radiation. It is especially preferred that the article be exposed to no such ionizing radiation during the heating step, except as may be present due to natural background radiation.

The atmospheric pressure during the heating step may be subatmospheric, atmospheric or superatmospheric. A superatmospheric pressure such as 689 kpa to 6895 kpa gauge (100 to 1000 psi gauge) is beneficial.

The heating step may be continued for a period of, for example at least one minute, at least 15 minutes, or at least 30 minutes. Periods longer than 2 hours are generally unnecessary but can be used if more crosslinking is needed or the article is large or thick. During the heating step, the free radical initiator produces free radicals. The free radicals and polyene crosslink the polyamide and/or polyester resin. The crosslink density generally increases with increasing heating time.

The crosslinking typically produces changes in the physical and/or thermal properties of the polyamide and/or polyester component of the article. The crosslinked polyamide and/or polyester component may exhibit one or more i) non-melting behavior characteristic of thermoset resins; ii) delayed ignition and/or iii) reduced dripping when exposed to an open flame, among others.

Mechanical properties may also change somewhat as a result of the crosslinking Fabrics treated in accordance with the invention often exhibit a significant reduction in dripping when subjected to a flame test such as ASTM D6413-11, EN 13501-1 Single Burning Item test and the British Standard BS5867 Part 2-Type B test. A fabric treated in accordance of this invention often exhibits insignificant changes in properties such as airflow, "hand", draping, etc.

Various optional components of the coating composition, or reaction products thereof may remain with the treated article, forming a coating thereupon and/or in some cases penetrating into the polyamide and/or polyester component of the article. As discussed above, certain carriers remain with the treated article and impart functional characteristics to it. Examples of these include plasticizers and various finishing attribute components as described above. Polymerizable components of the coating composition can polymerize under the conditions of the heating step to produce a polymer that coats, interpenetrates with and/or becomes grafted to the article. Doing so in some cases produces an elastomeric component that may compensate for decreases in elasticity due to the crosslinking Vinyl-terminted polysiloxanes, for example, can polymerize and/or graft to the polyamide and/or polyester under the conditions of step (b) to impart elasticity.

The following examples are intended to illustrate the invention but not to limit the scope thereof. All parts and percentages are by weight unless otherwise indicated.

EXAMPLE 1

A coating composition is prepared by combining 47.5 parts of triallylisocyanurate, 47.5 parts of a vinyl-terminated polysiloxane polymer having a nominal viscosity of 500 cSt and a vinyl content of 0.15 mmol/g and 5 parts of azobisiso (butyronitrile) in a high shear mixer.

This coating composition is applied at about 23° C. and using a gravure coater to each side of each of the following fabrics at a coating weight of approximate 0.3 kg per kg of fabric per side.

Fabric A: A 98:2 blend of nylon 6,6 and spandex in camouflage color, fabric weight 144 grams/m².
Fabric B: 100% nylon 6,6 in camouflage color, fabric weight 48 grams/m².
Fabric C: 100% nylon 6,6 in gray color, fabric weight 50 grams/m².

Each of Fabrics A, B and C exhibit fiber melting temperatures greater than 150° C. as measured in accordance with ASTM D7138-16. Nylon 6,6 by itself has a crystalline melting temperature>150° C.

After coating, the fabrics are then heat treated for 1 hour at 100° C. under a 400 psig (2.76 MPa) nitrogen (oxygen content<100 ppm) in an autoclave to produce crosslinks in the nylon.

The treated fabrics as well as samples of the untreated fabrics are evaluated for air permeability on an DA Atlas M021A Air Permeability Tester, and for water repellency using the AATCC TM-022 spray test.

The treated fabrics are also subjected to a vertical flame dripping test as follows: A 3 inch (7.62 cm)×12 inch (30.48 cm) fabric sample is hung vertically. A flame 1.5 inch (3.81 cm) in height was placed under the lower end of the sample to ignite it for 12 seconds before being removed. The flammability and melting/dripping of the sample during burning is observed.

Each of the untreated fabrics melts and forms drips under the conditions of the vertical flame dripping test. After treatment, no melting or dripping is observed in any of the fabric samples.

In addition, all fabrics exhibit a large improvement in water repellency, increased from a rating of 0 to 70 in the case of Fabric A and 0 to 100 in the case of Fabrics B and C. All fabrics exhibit a small decrease in air permeability.

EXAMPLE 2

A coating composition is prepared by combining 47 parts of triallylisocyanurate, 25 parts of a vinyl-terminated polysiloxane polymer having a nominal viscosity of 500 cSt and a vinyl content of 0.15 mmol/g, 24 parts of a poly(dimethylsiloxane) having a nominal viscosity of 1000 cSt and 3 parts of azobisiso(butyronitrile) in a high shear mixer.

This coating composition is applied at about 23° C. and using a gravure coater to each side of each of Fabrics A and B at a coating weight of approximate 0.3 kg per kg of fabric per side. After coating, the fabrics are heat treated for 30 minutes at 100° C. under a 400 psig (2.76 MPa) nitrogen (oxygen content<100 ppm) in an autoclave to produce crosslinks in the nylon.

Samples of treated fabrics as well as samples of the untreated fabrics are evaluated for air permeability, water repellency and performance in the vertical flame dripping test.

As before, each of the untreated fabrics melts and forms drips under the conditions of the vertical flame dripping test. After treatment, no melting or dripping is observed in any of the fabric samples, even after undergoing 20 wash cycles.

The water repellency spray rating of Fabric A increases from zero to 60, dropping to 50 after undergoing the 20 wash cycles. Air permeability of untreated fabric A is 7.2 standard cubic feet/minute (3.49 L/s), which remains essentially unchanged after treatment. The air permeability of the treated fabric drops to 4.2 CFM (1.98 L/s) after 20 wash cycles.

The water repellency spray rating of Fabric B increases from 0 to 60 after treatment. Air permeability decreases from 23.3 CFM (11.0 L/s) to 17.1 CFM (8.07 L/s) after treatment, and further to 12.8 CFM (6.04 L/s) after 20 wash cycles.

EXAMPLE 3

Separate samples of Fabric A are treated on each side with one of the following coating compositions and heat-treated for 30 minutes to produce crosslinks in the resin in the manner described in the previous examples.

Composition 3A: 37 parts of triallylisocyanurate, 20 parts of a vinyl-terminated polysiloxane polymer having a nominal viscosity of 500 cSt and a vinyl content of 0.15 mmol/g, 19.5 parts of a poly(dimethylsiloxane) having a nominal viscosity of 1000 cSt, 2.5 parts of azobisiso(butyronitrile) and 20 parts melamine cyanurate.

Composition 3B: 37 parts of triallylisocyanurate, 20 parts of a vinyl-terminated polysiloxane polymer having a nominal viscosity of 500 cSt and a vinyl content of 0.15 mmol/g, 19.5 parts of a poly(dimethylsiloxane) having a nominal viscosity of 1000 cSt, 2.5 parts of azobisiso(butyronitrile) and 20 parts melamine polyphosphate.

Neither of the treated samples exhibits melting or dripping on the flame test. Air permeability is 7.2 CFM (11.0 L/s) for the untreated sample and drops only slightly to 6.2 CFM (2.83 L/s) and 6.8 CFM (3.21 L/s) for samples treated with compositions 3A and 3B, respectively. The water repellency rating is 50 in each case.

EXAMPLE 4

A coating composition is prepared by combining 46.5 parts of triallylisocyanurate, 46.5 parts of a vinyl-terminated polysiloxane polymer having a nominal viscosity of 500 cSt and a vinyl content of 0.15 mmol/g and 5 parts of azobisiso (butyronitrile) in a high shear mixer.

This coating composition is applied at about 23° C. onto a poly(ethylene terephthalate) fabric having a weight of 139 grams/square meter and the heated for one hour in the manner described in the previous examples to produce crosslinks in the resin. This fabric has a melting temperature>150° C. as measured according to ASTM D7138-16. Although the untreated fabric melts and drips under the vertical flame test, the treated fabric exhibits no melting or dripping. The air permeability of the treated fabric is 373 CFM (176 L/s), compared with 397 CFM (187 L/s) for the untreated fabric.

The invention claimed is:

1. A solid-state method for treating a thermoplastic article which thermoplastic article comprises a thermoplastic material component having a crystalline melting temperature of at least 100° C., in which the thermoplastic material component comprises at least one thermoplastic resin, the method comprising:
    a) at a temperature below the crystalline melting temperature of the thermoplastic material component, applying a coating composition to at least one surface of the article and into contact with at least one thermoplastic polymer of the thermoplastic material component of the article, wherein the coating composition comprises i) at least 20 weight percent of at least one polyene compound, the polyene compound having 2 to 6 vinyl groups, an equivalent weight per vinyl group of up to 500 g/equivalent, and (ii) at least one peroxy or azo free radical initiator; and
    b) heating the coated article to a temperature to decompose the peroxy or azo free radical initiator to form free radicals and produce crosslinking in the thermoplastic resin to provide a crosslinked thermoplastic article exhibiting one or more of i) non-melting behavior characteristics of thermoset resins, ii) delayed ignition when exposed to an open flame or heat compared to the thermoplastic article prior to the crosslinking, and iii) reduced dripping when exposed to an open flame or heat compared to the thermoplastic article prior to the crosslinking, wherein the temperature is below the crystalline melting temperature of the thermoplastic material component.

2. The solid-state method of claim 1, wherein the thermoplastic material component of the article is cross-linkable by a radical initiator.

3. The solid-state method of claim 1, wherein the thermoplastic article is formed as a fabric.

4. The solid-state method of claim 3, wherein the fabric includes fibers and/or yarns that are woven, knitted, entangled, knotted, felted, melt-bonded or glued together.

5. The solid-state method of claim 1, wherein the thermoplastic material component is selected from a polyamide and/or polyester.

6. The solid-state method of claim 1, wherein the thermoplastic material component comprises at least one thermoplastic aliphatic polyamide resin selected from the group consisting of nylon 4, nylon 6, nylon 8, nylon 9, nylon 10, nylon 12, nylon 4/6, nylon 5/6, nylon 6/6, nylon 6/9, nylon 10/10 and nylon 10/12, or combinations thereof.

7. The solid-state method of claim 1, wherein the thermoplastic material component comprises at least one thermoplastic polyester resin selected from the group consisting of poly(ethylene terephthalate), poly(butylene terephthalate), poly(ethylene adipate-co-terephthalate), poly(butylene adipate-co-terephthalate), poly(ethylene succinate), poly(1, 4-cyclohexylene-dimethylene terephthalate and poly(butylene succinate), or combinations thereof.

8. The solid-state method of claim 1, wherein the polyene compound is one or more of 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, cyclohexane dimethanol diacrylate, alkoxylated hexane diol diacrylate, neopentyl glycol diacrylate, propoxylated neopentyl glycol diacrylate, trimethylolpropane triacrylate, ethoxylated trimethylolpropane triacrylate, propoxylated trimethylolpropane triacrylate, glycerine triacrylate, ethyloxylated and/or propoxylated glycerine triacrylate, pentaerythritol di-, tri- or tetraacrylate, erythritol di-, tri- or tetraacrylate, acrylated polyester oligomer, bisphenol A diacrylate, acrylated bisphenol A diglycidylether, ethoxylated bisphenol A diacrylate, a tris(2-hydroxyethyl) isocyanurate triacrylate oligomer, an acrylated urethane oligomer, 1,4-butanediol diallyl ether, 1,5-pentanediol diallyl ether, 1,6-hexanediol diallyl ether, neopentyl glycol diallyl ether, diethylene glycol diallyl ether, triethylene glycol diallyl ether, tetraethylene glycol diallyl ether, polyethylene glycol diallyl ether, dipropylene glycol diallyl ether, tripropylene glycol diallyl ether, cyclohexane dimethanol diallyl ether, alkoxylated hexanediol diallyl ether, neopentyl glycol diallyl ether, propoxylated neopentyl glycol diallyl ether, trimethylolpropane di- or triallyl ether, ethoxylated trimethylolpropane di- or triallyl ether, propoxylated trimethylolpropane di- or triallyl ether, glycerine di- or triallyl ether, ethoxylated and/or propoxylated glycerine di- or triallyl ether, pentaerythritol di-, tri- or tetraallyl ether, erythritol di-, tri- or tetraallyl ether, acrylated polyester oligomer, bisphenol A diacrylate, acrylated bisphenol A diglycidyl ether, ethoxylated bisphenol A diallyl ether, diallyl maleate, diallyl fumarate, diallyl phthalate, diallyl terephthalate, diallyl succinate, di- or triallyl citrate triallyl cyanurate and triallyl isocyanurate.

9. The solid-state method of claim 1, wherein the free radical initiator constitutes 2 to 7.5% of the total weight of the coating composition.

10. A solid-state method for treating a thermoplastic fabric which fabric comprises thermoplastic material fibers, the thermoplastic material fibers including a first type of thermoplastic resin fibers alone or a blend of thermoplastic resin fibers with fibers of at least one other polymer that is not the first type of thermoplastic resin fibers, and the thermoplastic material fibers having a melting temperature of at least 100° C. as measured according to ASTM D7138-16, the method comprising:
    a) at a temperature below the melting temperature of the thermoplastic material fibers, applying a coating composition to at least one surface of the fabric, wherein the coating composition comprises i) at least 20 weight percent of at least one polyene compound, the polyene compound having 2 to 6 vinyl groups, an equivalent weight per vinyl group of up to 500 g/equivalent, and (ii) at least one peroxy or azo free radical initiator; and
    b) heating the coated fabric to a temperature of at least 70° C. but below the melting temperature of the thermoplastic material fibers to decompose the peroxy or azo free radical initiator to form free radicals and produce branching and/or crosslinking in the thermoplastic material fibers to provide a crosslinked thermoplastic fabric exhibiting one or more of i) non-melting behavior characteristics of thermoset resins, ii) delayed ignition when exposed to an open flame or heat compared to the thermoplastic fabric prior to the crosslinking, and iii) reduced dripping when exposed to an open flame or heat compared to the thermoplastic fabric prior to the crosslinking.

11. The solid-state method of claim 10, wherein a thermoplastic material of the thermoplastic fibers is crosslinkable by a radical initiator.

12. The solid-state method of claim 10, wherein the fabric includes fibers and/or yarns that are woven, knitted, entangled, knotted, felted, melt-bonded or glued together.

13. The solid-state method of claim 10, wherein the thermoplastic material is selected from a polyamide and/or polyester.

14. The solid-state method of claim 10, wherein the thermoplastic material comprises at least one thermoplastic aliphatic polyamide resin selected from the group consisting of nylon 4, nylon 6, nylon 8, nylon 9, nylon 10, nylon 12, nylon 4/6, nylon 5/6, nylon 6/6, nylon 6/9, nylon 10/10 and nylon 10/12, or combinations thereof.

15. The solid-state method of claim 10, wherein the thermoplastic material comprises at least one thermoplastic polyester resin selected from the group consisting of poly(ethylene terephthalate), poly(butylene terephthalate), poly(ethylene adipate-co-terephthalate), poly(butylene adipate-co-terephthalate), poly(ethylene succinate), poly(1,4-cyclohexylene-dimethylene terephthalate and poly(butylene succinate), or combinations thereof.

16. The solid-state method of claim 10, wherein the polyene compound is one or more of 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, cyclohexane dimethanol diacrylate, alkoxylated hexane diol diacrylate, neopentyl glycol diacrylate, propoxylated neopentyl glycol diacrylate, trimethylolpropane triacrylate, ethoxylated trimethylolpropane triacrylate, propoxylated trimethylolpropane triacrylate, glycerine triacrylate, ethyloxylated and/or propoxylated glycerine triacrylate, pentaerythritol di-, tri- or tetraacrylate, erythritol di-, tri- or tetraacrylate, acrylated polyester oligomer, bisphenol A diacrylate, acrylated bisphenol A diglycidylether, ethoxylated bisphenol A diacrylate, a tris(2-hydroxyethyl) isocyanurate triacrylate oligomer, an acrylated urethane oligomer, 1,4-butanediol diallyl ether, 1,5-pentanediol diallyl ether, 1,6-hexanediol diallyl ether, neopentyl glycol diallyl ether, diethylene glycol diallyl ether, triethylene glycol diallyl ether, tetraethylene glycol diallyl ether, polyethylene glycol diallyl ether, dipropylene glycol diallyl ether, tripropylene glycol diallyl ether, cyclohexane dimethanol diallyl ether, alkoxylated hexanediol diallyl ether, neopentyl glycol diallyl ether, propoxylated neopentyl glycol diallyl ether, trimethylolpropane di- or triallyl ether, ethoxylated trimethylolpropane di- or triallyl ether, propoxylated trimethylolpropane di- or triallyl ether, glycerine di- or triallyl ether, ethoxylated and/or propoxylated glycerine di- or triallyl ether, pentaerythritol di-, tri- or tetraallyl ether, erythritol di-, tri- or tetraallyl ether, acrylated polyester oligomer, bisphenol A diacrylate, acrylated bisphenol A diglycidyl ether, ethoxylated bisphenol A diallyl ether, diallyl maleate, diallyl fumarate, diallyl phthalate, diallyl terephthalate, diallyl succinate, di- or triallyl citrate triallyl cyanurate and triallyl isocyanurate.

17. The solid-state method of claim 10, wherein the free radical initiator constitutes 2 to 7.5% of the total weight of the coating composition.

18. A solid-state method for reducing melting and/or dripping of thermoplastic fabric which fabric comprises thermoplastic fibers, the thermoplastic fibers including a first type of thermoplastic resin fibers alone or a blend of thermoplastic resin fibers with fibers of at least one other polymer that is not the first type of thermoplastic resin fibers, the thermoplastic fibers having a melting temperature of at least 100° C. as measured according to ASTM D7138-16, the method comprising:

a) at a temperature below the melting temperature of the thermoplastic fibers, applying a coating composition to at least one surface of the fabric, wherein the coating composition comprises i) at least 20 weight percent of at least one polyene compound, the polyene compound having 2 to 6 vinyl groups, an equivalent weight per vinyl group of up to 500 g/equivalent, and (ii) at least one peroxy or azo free radical initiator; and b) heating the coated fabric to a temperature of at least 70° C. but below the melting temperature of the thermoplastic fibers for a period of 1 minute to 2 hours to provide a crosslinked thermoplastic fabric exhibiting one or more of i) non-melting behavior characteristics of thermoset resins, ii) delayed ignition when exposed to an open flame or heat compared to the thermoplastic fabric prior to the crosslinking, and iii) reduced dripping when exposed to an open flame or heat compared to the thermoplastic fabric prior to the crosslinking.

19. The solid-state method of claim 18, wherein a thermoplastic material of the thermoplastic fibers is crosslinkable by a radical initiator.

20. The solid-state method of claim 19, wherein at least one of:

the thermoplastic material comprises at least one thermoplastic aliphatic polyamide resin selected from the group consisting of nylon 4, nylon 6, nylon 8, nylon 9, nylon 10, nylon 12, nylon 4/6, nylon 5/6, nylon 6/6, nylon 6/9, nylon 10/10 and nylon 10/12, or combinations thereof;

the thermoplastic material comprises at least one thermoplastic polyester resin selected from the group consisting of poly(ethylene terephthalate), poly(butylene terephthalate), poly(ethylene adipate-co-terephthalate), poly(butylene adipate-co-terephthalate), poly(ethylene succinate), poly(1,4-cyclohexylene-dimethylene terephthalate and poly(butylene succinate), or combinations thereof; or the polyene compound is one or more of 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, cyclohexane dimethanol diacrylate, alkoxylated hexane diol diacrylate, neopentyl glycol diacrylate, propoxylated neopentyl glycol diacrylate, trimethylolpropane triacrylate, ethoxylated trimethylolpropane triacrylate, propoxylated trimethylolpropane triacrylate, glycerine triacrylate, ethyloxylated and/or propoxylated glycerine triacrylate, pentaerythritol di-, tri- or tetraacrylate, erythritol di-, tri- or tetraacrylate, acrylated polyester oligomer, bisphenol A diacrylate, acrylated bisphenol A diglycidylether, ethoxylated bisphenol A diacrylate, a tris(2-hydroxyethyl) isocyanurate triacrylate oligomer, an acrylated urethane oligomer, 1,4-butanediol diallyl ether, 1,5-pentanediol diallyl ether, 1,6-hexanediol diallyl ether, neopentyl glycol diallyl ether, diethylene glycol diallyl ether, triethylene glycol diallyl ether, tetraethylene glycol diallyl ether, polyethylene glycol diallyl ether, dipropylene glycol diallyl ether, tripropylene glycol diallyl ether, cyclohexane dimethanol diallyl ether, alkoxylated hexanediol diallyl ether, neopentyl glycol diallyl ether, propoxylated neopentyl glycol diallyl ether, trimethylolpropane di- or triallyl ether, ethoxylated trimethylolpropane di- or triallyl ether, propoxylated trimethylolpropane di- or triallyl ether, glycerine di- or triallyl ether, ethoxylated and/or propoxylated glycerine di- or triallyl ether, pentaerythritol di-, tri- or tetraallyl ether, erythritol di-, tri- or tetraallyl ether, acrylated polyester oligomer, bisphenol A diacrylate, acrylated bisphenol A diglycidyl ether, ethoxylated bisphenol A diallyl ether, diallyl maleate, diallyl fumarate, diallyl phthalate, diallyl terephthalate, diallyl succinate, di- or triallyl citrate triallyl cyanurate and triallyl isocyanurate.

* * * * *